US008284932B2

(12) United States Patent
Whillock et al.

(10) Patent No.: US 8,284,932 B2
(45) Date of Patent: *Oct. 9, 2012

(54) IMPARTING CRYPTOGRAPHIC INFORMATION IN NETWORK COMMUNICATIONS

(75) Inventors: Asa Whillock, San Francisco, CA (US); Edward Chan, Fremont, CA (US); Srinivas Manapragada, Fremont, CA (US); Matthew Kaufman, Bonny Doon, CA (US); Pritham Shetty, Los Altos, CA (US); Michael Thornburgh, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/304,304

(22) Filed: Nov. 23, 2011

(65) Prior Publication Data

US 2012/0233467 A1    Sep. 13, 2012

Related U.S. Application Data

(63) Continuation of application No. 13/158,221, filed on Jun. 10, 2011, which is a continuation of application No. 11/872,661, filed on Oct. 15, 2007, now Pat. No. 7,961,878.

(51) Int. Cl.
*H04L 3/08* (2006.01)

(52) U.S. Cl. ............ 380/43; 380/258; 380/37; 380/217; 380/229; 380/232; 380/278; 380/279; 380/212; 380/200; 713/160; 713/155; 709/230; 709/231; 709/237; 709/219; 710/105; 726/14

(58) Field of Classification Search .................. 380/258, 380/43, 37, 217, 229, 232, 278, 279, 212, 380/200; 713/160; 709/230, 231, 237; 710/105; 726/14

See application file for complete search history.

(56) References Cited

U.S. PATENT DOCUMENTS 5,185,795 A    2/1993   Bright
(Continued)

FOREIGN PATENT DOCUMENTS

EP           1 418 756           5/2004
(Continued)

OTHER PUBLICATIONS

Adkhis, F., Authorized Officer, European Patent Office, in PCT International Application No. PCT/US2008/079886, filed Oct. 14, 2008, International Search Report dated May, 20 2009, 15 pages.
(Continued)

*Primary Examiner* — April Shan
(74) *Attorney, Agent, or Firm* — Fish & Richardson P.C.

(57) ABSTRACT

This specification describes technologies relating to imparting cryptographic information in network communications. In general, aspects of the subject matter described in this specification can be embodied in methods that include identifying a location in a pre-defined portion of a network communication to be sent in a client-server environment, wherein the pre-defined portion is reserved for random data, inserting cryptographic information into the pre-defined portion of the network communication at the location, and sending the network communication in the client-server environment to facilitate modifying interactions in the client-server environment based at least in part on a result of processing of the cryptographic information; and on a receiving side, receiving cryptographic information inserted into the pre-defined portion of the network communication in the client-server environment, identifying the location, processing the cryptographic information, and modifying interactions in the client-server environment based at least in part on a result of the processing.

21 Claims, 5 Drawing Sheets

U.S. PATENT DOCUMENTS

| | | | |
|---|---|---|---|
| 5,481,610 A | 1/1996 | Doiron et al. | |
| 5,841,432 A | 11/1998 | Carmel et al. | |
| 5,850,481 A | 12/1998 | Rhoads | |
| 6,021,391 A | 2/2000 | Shyu | |
| 6,032,197 A | 2/2000 | Birdwell et al. | |
| 6,295,604 B1 | 9/2001 | Callum | |
| 6,317,416 B1 | 11/2001 | Giroux et al. | |
| 6,370,272 B1 | 4/2002 | Shimizu | |
| 6,397,230 B1 | 5/2002 | Carmel et al. | |
| 6,397,259 B1 | 5/2002 | Lincke et al. | |
| 6,438,123 B1 | 8/2002 | Chapman | |
| 6,453,355 B1 | 9/2002 | Jones et al. | |
| 6,477,580 B1 | 11/2002 | Bowman-Amuah | |
| 6,760,378 B1 | 7/2004 | Conklin | |
| 6,763,390 B1 | 7/2004 | Kovacevic et al. | |
| 6,801,947 B1 | 10/2004 | Li | |
| 6,823,394 B2 | 11/2004 | Waldvogel et al. | |
| 6,985,932 B1 | 1/2006 | Glaser et al. | |
| 6,999,424 B1 | 2/2006 | Kovacevic et al. | |
| 7,010,613 B2 | 3/2006 | Connor | |
| 7,035,287 B2 | 4/2006 | Tourunen et al. | |
| 7,039,192 B1 | 5/2006 | Whelan | |
| 7,046,672 B2 | 5/2006 | Liao et al. | |
| 7,051,200 B1 | 5/2006 | Manferdelli et al. | |
| 7,058,728 B1 | 6/2006 | Eklund | |
| 7,061,936 B2 | 6/2006 | Yoshimura et al. | |
| 7,111,162 B1 | 9/2006 | Bagepalli et al. | |
| 7,130,314 B2 | 10/2006 | Bunn et al. | |
| 7,136,377 B1 | 11/2006 | Tweedly et al. | |
| 7,154,895 B1 | 12/2006 | Bornemisza et al. | |
| 7,158,518 B2 | 1/2007 | Burmeister et al. | |
| 7,167,560 B2 | 1/2007 | Yu | |
| 7,215,667 B1 | 5/2007 | Davis | |
| 7,239,703 B2 | 7/2007 | Higurashi et al. | |
| 7,249,264 B2 | 7/2007 | Belknap et al. | |
| 7,251,832 B2 | 7/2007 | Venters et al. | |
| 7,266,118 B2 | 9/2007 | Ido et al. | |
| 7,272,658 B1 * | 9/2007 | Edelman et al. | 709/231 |
| 7,298,849 B2 | 11/2007 | Graunke | |
| 7,310,353 B1 | 12/2007 | Bourlas et al. | |
| 7,330,902 B1 | 2/2008 | Bergenwall et al. | |
| 7,333,921 B2 | 2/2008 | Taylor et al. | |
| 7,372,964 B2 | 5/2008 | Mimura et al. | |
| 7,406,176 B2 | 7/2008 | Zhu et al. | |
| 7,428,247 B2 | 9/2008 | Bunn et al. | |
| 7,433,930 B2 | 10/2008 | Fenizia et al. | |
| 7,434,052 B1 | 10/2008 | Rump | |
| 7,436,955 B2 | 10/2008 | Yan et al. | |
| 7,499,545 B1 | 3/2009 | Bagshaw | |
| 7,570,766 B2 | 8/2009 | Mangold et al. | |
| 7,583,695 B2 | 9/2009 | Vimpari et al. | |
| 7,587,509 B1 | 9/2009 | Edelman et al. | |
| 7,590,237 B2 | 9/2009 | Krause et al. | |
| 7,590,242 B2 | 9/2009 | Genevois | |
| 7,590,844 B1 | 9/2009 | Sherman et al. | |
| 7,594,110 B2 | 9/2009 | Carr | |
| 7,640,435 B2 | 12/2009 | Morten | |
| 7,681,227 B2 | 3/2010 | Zwart et al. | |
| 7,693,186 B2 | 4/2010 | Bunn et al. | |
| 7,702,101 B2 | 4/2010 | Malcolm et al. | |
| 7,769,168 B2 | 8/2010 | Zhu et al. | |
| 7,787,622 B2 | 8/2010 | Sprunk | |
| 7,836,124 B2 | 11/2010 | Saxena et al. | |
| 7,839,998 B2 | 11/2010 | Candelore et al. | |
| 7,840,489 B2 | 11/2010 | Candelore | |
| 7,848,520 B2 | 12/2010 | Candelore et al. | |
| 7,934,000 B2 | 4/2011 | Chouksey et al. | |
| 7,961,878 B2 | 6/2011 | Whillock et al. | |
| 7,975,280 B2 | 7/2011 | Bertram | |
| 8,000,475 B1 | 8/2011 | Guman | |
| 8,009,620 B2 | 8/2011 | Zheng et al. | |
| 8,051,287 B2 | 11/2011 | Shetty et al. | |
| 2002/0025045 A1 | 2/2002 | Raike | |
| 2003/0005142 A1 | 1/2003 | Elzur et al. | |
| 2003/0046431 A1 | 3/2003 | Belleguie | |
| 2003/0061369 A1 | 3/2003 | Aksu et al. | |
| 2003/0221014 A1 | 11/2003 | Kosiba et al. | |
| 2004/0064725 A1 | 4/2004 | Padmanabhan et al. | |
| 2004/0111610 A1 | 6/2004 | Slick et al. | |
| 2004/0215803 A1 | 10/2004 | Yamada et al. | |
| 2005/0129243 A1 | 6/2005 | Bousis | |
| 2005/0188007 A1 | 8/2005 | Warner et al. | |
| 2005/0235145 A1 | 10/2005 | Slick et al. | |
| 2006/0136875 A1 | 6/2006 | Thorpe | |
| 2006/0174134 A1 | 8/2006 | Taylor | |
| 2006/0184790 A1 | 8/2006 | Oliveira et al. | |
| 2006/0195886 A1 | 8/2006 | Ashley | |
| 2006/0269058 A1 | 11/2006 | Kessler | |
| 2007/0076877 A1 | 4/2007 | Camp et al. | |
| 2007/0110237 A1 | 5/2007 | Tehranchi et al. | |
| 2007/0127458 A1 | 6/2007 | Small et al. | |
| 2007/0220118 A1 | 9/2007 | Loyer | |
| 2009/0003600 A1 | 1/2009 | Chen et al. | |
| 2009/0116646 A1 | 5/2009 | Pippuri | |
| 2009/0238365 A1 | 9/2009 | Bardera Bosch et al. | |

FOREIGN PATENT DOCUMENTS

| | | |
|---|---|---|
| EP | 1 487 147 | 12/2006 |
| WO | WO 2005/072225 | 8/2005 |

OTHER PUBLICATIONS

Advantages of On2 VP6 Technology, Oct. 20, 2006, published by On2 Technologies, Inc., 18 pages.

Chapter 6: What is Streaming Media and How does it Work?, Jul. 18, 2007, published by the Internet, <http://service.real.comlhelp/player/plus manual. g2/htrnlfiles/whatisrp .htrn, 13 pages.

"Common Multimedia Formats and Extentions"., Jul. 18, 2007, published by SorensonMedia, <hitp://wwvv.sorensontech.comlleam/video_file_format.php>, 2 pages.

Linder, Nora, Authorized Officer, The International Bureau of WIPO, International Application No. PCT/US2008/079886 filed Oct. 14, 2008, International Preliminary Report dated Apr. 29, 2010, 8 pages.

Quicktime Streaming Server Administrator's Guide. 2002, published by Apple Computer, Inc. 2002, 84 pages.

"Real Time Messaging Protocol Chunk Stream", Apr. 2009, Adobe Systems Incorporated, 70 pages.

Salowey et al., "Transport Layer Security (TLS) Session Resumption Without Server-Side State", IETF Standard-Working-Draft, Internet Engineering Task Force, IETF, CH, Jun. 11, 2007, Abstract, p. 4, line 4, p. 9, line 23, 15 pages.

Schulzrinne, H. et al. "Real Time Streaming Protocol (RTSP)", Apr. 1998, published by The Internet Society, 86 pages.

U.S. Patent Office, U.S. Appl. No. 11/872,661, filed Oct. 15, 2007, in Office Action, mailed Nov. 16, 2010, 24 pages.

"Truemotion VP7 Video Codec", Jan. 10, 2005, published by On2 Technologies, Inc., 13 pages.

Adobe, Archived Jul. 15, 2006 version of Adobe® Flash® Player 10.1 feature page: http://webarchive.nationalarchives.gov.uk/20060715171503/adobe.com/products/flashplayer/features/index.hlml.

Ahsan, K., et al., "Practical Data Hiding in TCP/IP," Proc. Workshop on Multimedia Security at ACM Multimedia '02, French Riviera, Dec. 6, 2002, 8 pages.

Anderson, David et al., "A Continuous Media I/O Server and Its Synchronization Mechanism," University of California at Berkeley, Oct. 1991, pub. IEEE 1991.

Artz, D., "Digital Steganography: Hiding Data within Data," Los Alamos National Laboratory, IEEE Internet Computing, http://computer.org/internet/, May-Jun. 2001, pp. 75-80.

Birk, Yitzhak, "Deterministic Load-Balancing Schemes for Disk-Based Videoon-Demand Storage Servers," Fourteenth IEEE Symposium on Mass Storage Systems, 1995 IEEE.

Chen, Herng-Yow, et al., "A Novel Multimedia Synchronization Model and Its Applications in Multimedia Systems," IEEE Transactions on Consumer Electronics, vol. 41, No. 1, Feb. 1995 (Revised manuscript received Dec. 13, 1994).

Cole, E., "Hiding in Plain Sight: Steganography and the Art of Covert Communication," ISBN-10:0471444499, Wiley Publishing, Inc., 2003, 363 pages, Apr. 11, 2003.

Das, Amitabha, "A Model for Synchronisation and Communication of Distributed Multimedia Data Streams," IEEE Catalogue No. 95TH8061, 1995 IEEE.

Faulk, Stuart, et al., "On Synchronization in Hard-Real-Time Systems," Communications of the ACM, vol. 31, No. 3, Mar. 1988.

Greaves, David, et al., "ATM for Video and Audio on Demand," AES UK Audio for New Media Conference, UK 11th Conference: Audio for New Media (ANM), Mar. 1996.

Haskin, R., "Tiger Shark—A scalable file system for multimedia," IBM Journal of Research and Development, Mar. 1998.

Herrtwich, Ralf Guido, et al., "A System Software Structure for Distributed Multimedia Systems," IBM European Networking Center, ACM SIGOPS European Workshop 1992.

Huang, D., et al., "A double authentication scheme to detect impersonation attack in link state routing protocols," Proc. of IEEE International Conference on Communications (ICC2003), Anchorage, Alaska, May 11, 2003, pp. 1723-1727.

Huang, Chung-Ming, et al., Multimedia Synchronzation for Live Presentation Using the N-Buffer Approach, 1995 IEEE.

ISMA Internet Streaming Media Alliance Implementation Specification: ISMA Encryption and Authentication Specification v.1.1., AREA/Task Force: DRM, Sep. 15, 2006, 64 pages.

Jones, Alan, et al., "Handling Audio and Video Streams in a Distributed Environment," SIGOPS '93/12/93/N.C., USA.

Kawaguchi, E., et al. "A Model of Anonymous Covert Mailing System Using Steganographic Scheme," Information Modeling and Knowledge Bases XIV ISBN-10: 1586033182, 2003, pp. 81-85.

Kim, Jae-Gon, et al., "Design and Implementation of an MPEG-2 Transport Stream Multiplexer for HDTV Satellite Broadcasting," IEEE Transactions on Consumer Electronics, vol. 44, No. 3, Aug. 1998 (manuscript received Jun. 17, 1998).

Kundur, D., et al., "Practical Internet Steganography: Data Hiding in IP," Proc. Texas Workshop on Security of Information Systems, College Station, Texas, Apr. 2003, 5 pages.

Lacas, Mark, et al., "The MediaLink Real-Time Multimedia Network," presented at the 95th Convention, Audio Engineering Society, Oct. 7-10, 1993, New York.

Leung, Wu-Hon, et al., "A Software Architecture for Workstations Supporting Multimedia Conferencing in Packet Switching Networks," IEEE Journal on Selected Areas in Communications, vol. 8, No. 3, Apr. 1990.

Lin et al., "Streaming video and rate scalable compression: what are the challenges for watermarking," CERIAS Tech Report 2004-83, 2004.

Lucena, N., et al., "Syntax and Semantics-Preserving Application-Layer Protocol Steganography," Information Hiding Lecture Notes in Computer Science, 2005, vol. 3200/2005, 229:230, DOI: 10.1007/978-3-540-30114-1_12, Feb. 14, 2005.

MIDI 1.0 Detailed Specification, Document Version 4.2, Revised Sep. 1995, The MIDI Manufacturers Association, Los Angeles, CA.

Murdoch, S., et al., "Embedding Covert Channels into TCP/IP," Draft for Information Hiding Workshop 2005 proceedings, revision 1159, Jul. 29, 2005, 15 pages.

PHPBuilder.com, "Mar. 31, 2006, 06:36 AM comment by n_wattam to the post How to hide encryption key?" downloaded from the internet at: http://www.phpbuilder.com/board/archive/index.php/t-10320464.html , Mar. 31, 2006, 3 pages.

Rubin, Michael, "Droidmaker: George Lucas and the Digital Revolution,"© 2006.

Rumsey, Francis, Digital Audio Operations, Butterworth-Heinemann Ltd., 1991.

Rumsey, Francis, et al., Digital Interface Handbook, Third Edition, First published 1993, 3rd Edition 2004.

Salowey, J., et al., RFC 4507, Transport Layer Security (TLS) Session Resumption without Server-Side State, May 2006.

Shamir, A. et al., "Playing hide and seek with stored keys," Financial Cryptography Lecture Notes in Computer Science 1999, vol. 1648/1999, 118-124, DOI: 10.1007/3-540-48390-X_9, Sep. 22, 1998.

Swanson et al., "Multimedia Data-embedding and Watermarking Technologies," Proceedings of the IEEE, vol. 86, No. 6, Jun. 1998.

Szczypiorski, K., "Steganography in TCP/IP Networks. State of the Art and a Proposal of a New System—HICCUPS," Warsaw University of Technology, Poland Institute of Telecommunications, Warsaw, Poland, Nov. 4, 2003, 46 pages.

Trappe, W., et al., "Key distribution for secure multimedia multicasts via data embedding," Acoustics, Speech, and Signal Processing, 2001, Proceedings (ICASSP '01), May 2001, vol. 3, pp. 1449-1452, May 7, 2001.

Wu et al., "Selective Encryption and Watermarking of MPEG Video (Extended Abstract)," Submitted to International Conference on Image Science, Systems and Technologies, Feb. 17, 1997.

Yavelow, Christopher, Music & Sound Bible, IDG Books Worldwide, Inc., 1992.

Zander, S., et al., "A Survey of Covert Channels and Countermeasures in Computer Network Protocols," IEEE Communications Surveys & Tutorials, 3rd Quarter 2007, vol. 9, No. 3, pp. 44-57, Sep. 24, 2007.

* cited by examiner

IMPARTING CRYPTOGRAPHIC INFORMATION IN NETWORK COMMUNICATIONS

The present application is a continuation of, and claims priority under 35 U.S.C. 120 to, co-pending, commonly assigned, U.S. application Ser. No. 13/158,221, filed Jun. 10, 2011 and entitled "Imparting Cryptographic Information In Network Communications", which is a continuation of, and claims priority under 35 U.S.C. 120 to, co-pending, commonly assigned, U.S. application Ser. No. 11/872,661, filed Oct. 15, 2007 and entitled, "Imparting Cryptographic Information In Network Communications", issued as U.S. Pat. No. 7,961,878 on Jun. 14, 2011, the disclosures of which are hereby incorporated herein by reference.

BACKGROUND

The present disclosure relates to imparting cryptographic information in network communications.

A computer network is a collection of processing nodes coupled together with wired and/or wireless communication links. A computer network can be a single network or a collection of networks (e.g., an internetwork), and can use multiple networking protocols, including internetworking protocols (e.g., Internet Protocol (IP)). These protocols define the manner in which information is prepared for transmission through the network, and typically involve breaking data into segments generically known as packets (e.g., IP packets, ATM (Asynchronous Transfer Mode) cells) for transmission. These networking protocols are typically organized by a network architecture having multiple layers, where each layer provides communication services to the layer above it. The protocols can include shared-line protocols such as in Ethernet networks, connection-oriented switching protocols such as in ATM networks, and/or connectionless packet-switched protocols such as in IP.

Many computer networks use connectionless packet-switched protocols (e.g., IP). Packets are routed separately and can thus take different paths through the network. Various protocols have been built on top of connectionless packet-switched protocols, such as IP, to provide connection based communications over the underlying connectionless protocol. For example, Adobe Systems Incorporated has promulgated a communication protocol for the FLASH® Media Server in which a communication session is established through handshake communications between the server and the client. As part of this handshake, the Real Time Messaging Protocol (RTMP) included a random byte section in the communications for use in estimating the available bandwidth for the session between the client and the server.

SUMMARY

This specification describes technologies relating to imparting cryptographic information in network communications. In general, one aspect of the subject matter described in this specification can be embodied in a method that includes identifying a location in a pre-defined portion of a network communication to be sent in a client-server environment, wherein the pre-defined portion of the network communication is reserved for random data, inserting cryptographic information into the pre-defined portion of the network communication at the location, and sending the network communication in the client-server environment to facilitate modifying interactions in the client-server environment based at least in part on a result of processing of the cryptographic information. In addition, another aspect of the described subject matter can be embodied in a method that includes receiving cryptographic information inserted into a pre-defined portion of a network communication in a client-server environment, wherein the pre-defined portion of the network communication is reserved for random data, identifying a location of the cryptographic information in the pre-defined portion of the network communication, processing the cryptographic information, and modifying interactions in the client-server environment based at least in part on a result of the processing of the cryptographic information. Other embodiments of these aspects include corresponding systems, apparatus, and computer program products.

These and other embodiments can optionally include one or more of the following features. Identifying the location can include using at least part of the network communication to determine the location. The pre-defined portion can include the random data, and using at least part of the network communication to determine the location can include retrieving a portion of the random data, and determining an index into the pre-defined portion of the network communication based on the retrieved portion of the random data. Moreover, using at least part of the network communication to determine the location can include retrieving multiple different portions of the random data; and determining multiple different indices into the pre-defined portion of the network communication based on the different portions of the random data.

Processing the cryptographic information can include establishing a cryptographic key, and modifying interactions in the client-server environment can include initiating an encrypted session using the cryptographic key. In addition, processing the cryptographic information can include authenticating the network communication, and modifying interactions in the client-server environment can include turning on or off a feature of a program operating in the client-server environment.

According to another aspect, a system can include a server computer programmed to establish both non-encrypted sessions and encrypted sessions over a network, with client computers, using a session startup handshake including a network communication including a pre-defined portion reserved for random data; a first of the client computers programmed to establish non-encrypted sessions with the server computer using the session startup handshake; and a second of the client computers programmed to establish encrypted sessions with the server computer using the session startup handshake including cryptographic information inserted into the pre-defined portion of the network communication; wherein the server computer and the second client computer are programmed to perform operations including: identifying a location of the cryptographic information in the pre-defined portion of the network communication, processing the cryptographic information, and modifying interactions between the server computer and the second client computer based at least in part on a result of the processing of the cryptographic information.

The client computers can include mobile devices (such as mobile phones, game machines, personal digital assistants, and laptop computers) and stationary devices (such as workstations, desktop computers, and super computers). The operations can include the various operations of the method(s) described. Processing the cryptographic information can include authenticating the network communication, and establishing a cryptographic key; and modifying interactions between the server computer and the second client computer can include turning on or off a feature of a program operating in the server computer or the second client computer, and initiating an encrypted session between the server computer and the second client computer using the cryptographic key. Moreover, the server computer and the second client computer can be programmed to perform the operations comprising: inserting a message authentication code and encryption key establishment information into the network communication.

Particular embodiments of the subject matter described in this specification can be implemented to realize one or more of the following advantages. Encrypted sessions can be established using a method that reduces the risk of reverse engineering and is also backward compatible with an existing non-encrypted session establishment protocol. Encryption credentials can be established using the method, which credentials can be used to start an encrypted session, or to verify various other pieces of information. The method can resist reverse engineering since the credentials can be, in essence, hidden in plain sight within data that has been used for bandwidth detection. Moreover, the data (with cryptographic information hidden therein) can still be used for other purposes, such as for bandwidth detection or for holding other information.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
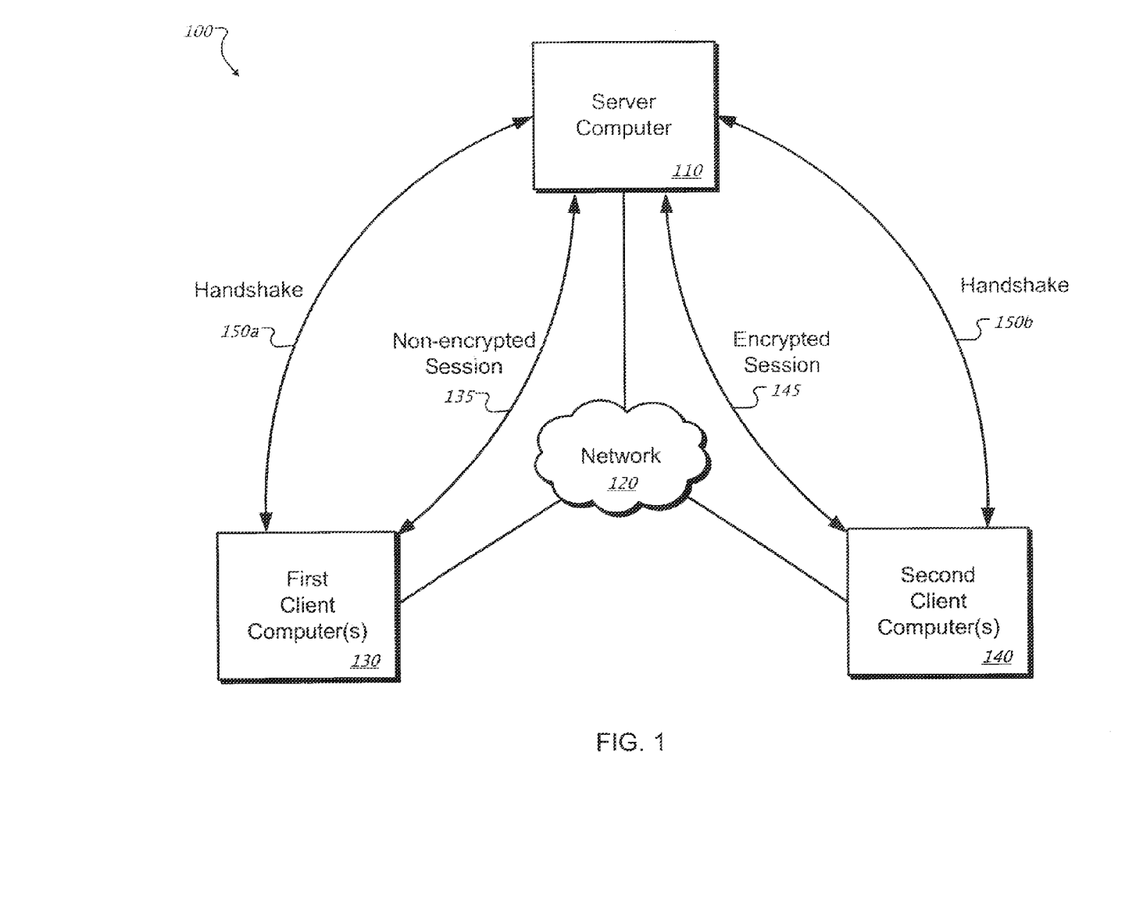
FIG. 1 shows an example client-server environment in which cryptographic information is imparted in network communications.

FIG. 1 shows an example client-server environment 100 in which cryptographic information is imparted in network communications. The client-server environment 100 can support both encrypted and non-encrypted sessions, both of which can include the use of a handshake 150, which can include authentication and other communication protocols. Cryptographic information can be included in a previously existing section of the handshake 150 known to contain random bytes, allowing the cryptographic information to remain hidden in plain sight since the cryptographic information appears random itself (due to the nature of the cryptographic information). Re-using the random byte section in this way can handicap reverse engineering attempts and provide interoperability with previously written software.

The client-server environment 100 includes a server computer 110. For example, the server computer 110 can be the FLASH® Media Server provided by Adobe Systems incorporated of San Jose, Calif. The server computer 110 can use a network 120 (e.g., the Internet) to communicate with one or more first client computers 130 and one or more second client computers 140. The handshakes 150a and 150b precede the sessions 135 and 145 and can include cryptographic information from the server 110 that the client(s) 130 may not know is there.

The session startup handshakes 150a and 150b can include one or more bytes that denote the version of the protocol (e.g., the RTMP protocol) and other information used to open a socket and establish a session. The handshakes 150a and 150b can also include other information, such as the current time as reported by the operating system (e.g., the number of milliseconds since the system was launched). The handshakes 150a and 150b include a block of bytes that contain random data, and the block of bytes can also include information useable for authenticating the network communications between server and client, and information for establishing an encrypted session. Such cryptographic information can be sent by the server computer 110 and the client computer(s) 140, but the client computer(s) 130 need not know that such information is present or be able to send such information.

The first client computer 130 can be a computer programmed to establish nom encrypted sessions with the server computer 110 using the session startup handshake 150a. For example, the first client computer 130 can include an older version of the FLASH® Player program, which starts a session with the server computer (e.g., the FLASH® Media Server). The server 110 can include cryptographic information in the block of random data in a network communication forming part of the handshake 150a. However, if the first client computer 130 fails to recognize this cryptographic information, and thus doesn't send appropriate return cryptographic information, the session 135 that is established with the server 110 is a non-encrypted session. Note that other aspects of the interactions between the server 110 and the client 130 can also be affected by this failure on the part of the computer 130, since the server 110 knows after the handshake 150a that the computer 130 is running a legacy program that is not aware of the new cryptographic information portion of the communication protocol.

In contrast, the second client computer 140 can be a computer programmed to establish encrypted sessions with the server computer 110 using the session startup handshake 150b. For example, the second client computer 140 can include a newer version of the FLASH® Player program, which starts an encrypted session with the server computer (e.g., the FLASH® Media Server). The server 110 can include cryptographic information in the block of random data in a network communication forming part of the handshake 150b. The second client computer 140 can recognize this cryptographic information and send appropriate return cryptographic information. This then allows the session 145 that is established with the server 110 to be an encrypted session. Note that other aspects of the interactions between the server 110 and the client 140 can also be affected by the handshake 150b, since the server 110 knows after the handshake 150b that the computer 140 is running a newer program that is aware of the new cryptographic information portion of the communication protocol. Thus, the cryptographic information used to establish encrypted sessions with new client programs can be added to an existing communication protocol used to establish non-encrypted sessions with old client programs, without the old client programs being aware of the newly added cryptographic information.

Figure 3:
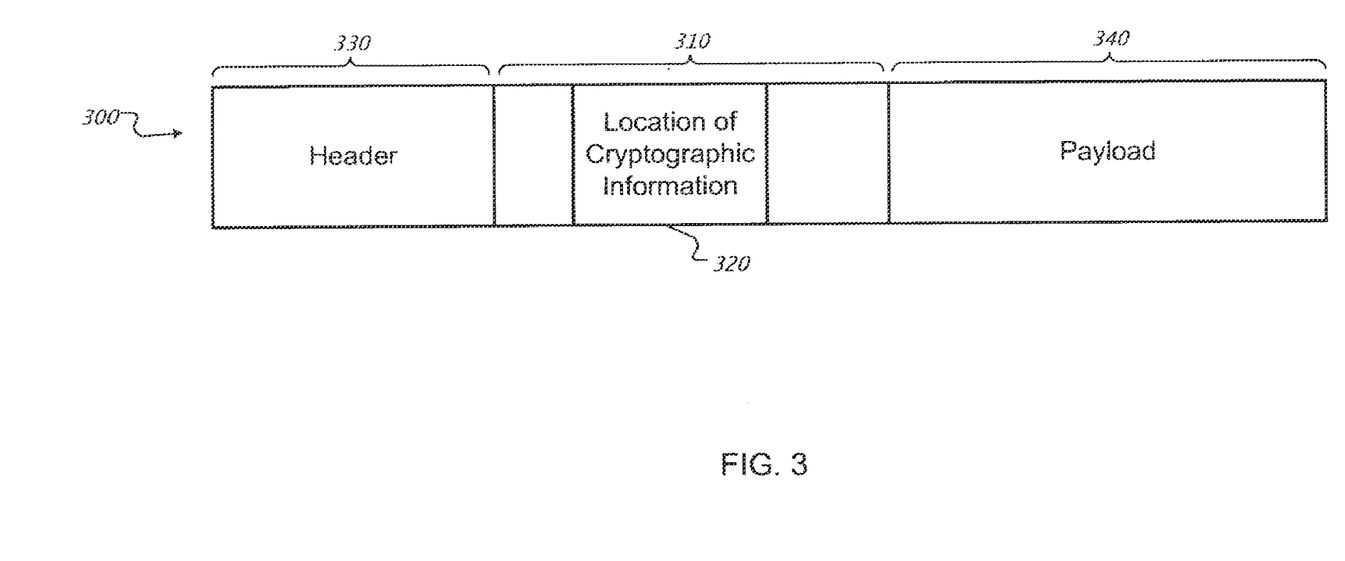
FIG. 3 shows an example network communication.

FIG. 3 shows an example network communication 300. The network communication 300 can be used, for example, as part of the handshakes 150a and 150b that precedes the sessions 135 and 145. The network communication 300 includes a pre-defined portion 310 that includes random data. In addition, the pre-defined portion 310 includes embedded cryptographic information at a location 320. In this way, the cryptographic information can be hidden in plain sight. Using this technique can reduce the likelihood that reverse engineering is able to discover the details of the communication protocol.

The location 320 of cryptographic information within the pre-defined portion 310 can vary with implementation or within a given implementation. For example, the cryptographic information can be located at a pre-determined byte location, or a pre-determined byte location can contain a value from which the location 320 of cryptographic information can be determined. In some implementations, using cryptographic information can include the use of an encryption key establishment protocol, such as a Diffie Hellman key exchange or other suitable technique for establishing one or more symmetric or asymmetric encryption keys. In some implementations, using cryptographic information can include the use an encrypted hash method of authenticating a transmission or content, such as a Hash Message Authentication Code (HMAC).

In addition, although the location 320 of cryptographic information is shown in FIG. 3 as being entirely contained within the pre-defined portion 310, it will be appreciated that either the beginning or end of the cryptographic information can be at the beginning or end of the pre-defined portion 310, e.g., adjacent to either a header 330 or a payload 340. The header 330 and the payload 340 can be, for example, part of the communication protocol that does not require encryption, such as to identify the version of the RTMP protocol being used. Such information can be used in handshake communications in both directions between the server computer 110 and the client computers 130 and 140.

The header 330 can include several pre-determined byte positions that can contain session information themselves or can identify byte locations of other information. For example, the FLASH® Player program can use a single byte to denote the version of the RTMP protocol. Such byte locations can depend, for example, on the version of the FLASH® Player program that a user has on a client device. Other specific byte positions can be used to identify the position of an HMAC and Diffie Hellman information. The payload 340 can include other information of the network communication 300, such as parameters that can be used for establishing the session on the user's client device. For example, the payload 340 can include information about the session, in some implementations, the payload 340 can include checksum information that can be used to test the integrity of the payload 340 and/or the entire network communication 300.

Figure 2:
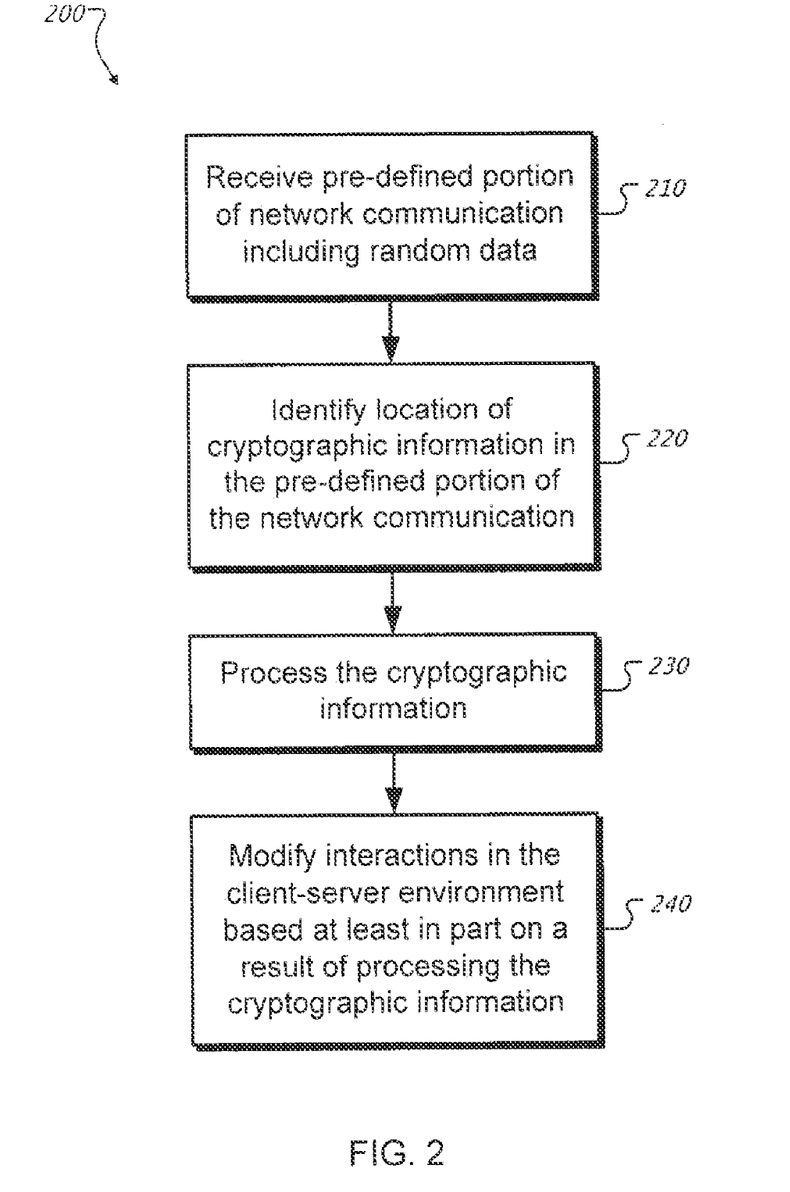
FIG. 2 shows an example process of imparting cryptographic information in network communications.

FIG. 2 shows an example process 200 of imparting cryptographic information in network communications. A pre-defined portion of a network communication, which includes random data, is received 210. For example, the portion 310 can be received by the computer 140. The location of cryptographic information in the pre-defined portion of the network communication can be identified 220. For example, the computer 140 can use at least part of the network communication 300 to determine the location. This part of the network communication 300 can conic from the portion 310, from the header 330, from the payload 340, or combinations of these. In some implementations, one or more parts of the network communication 300 can be used as a coded integer from which an actual byte location can be calculated (e.g., using modulo calculations or other similar calculations). In some implementations, calculations can be based on pre-determined modulo divisors, or the byte lengths of certain blocks of the network communication can be used as the divisor in a modulo calculation.

The cryptographic information can be processed 230. This can include establishing a cryptographic key, such as through Diffie Hellman key exchange. This can also include authenticating the network communication, such as through use of an HMAC. Interactions in the client-server environment can be modified 240 based at least in part on a result of processing the cryptographic information. Modifying the interactions can include turning on or off various features, such as editing, frame-based timelines, animation capabilities, shape primitives, development and/or language tools (e.g., JavaScript, ActionScript, etc.), sophisticated video tools, audio support, integration tools, conversion tools and rich drawing capabilities, to name a few examples. Modifying the interactions can include initiating an encrypted session using a cryptographic key. Note that the interactions in the client-server environment can also be based on identified capabilities of the client computer, since some features may be hardware dependent.

Figure 4:
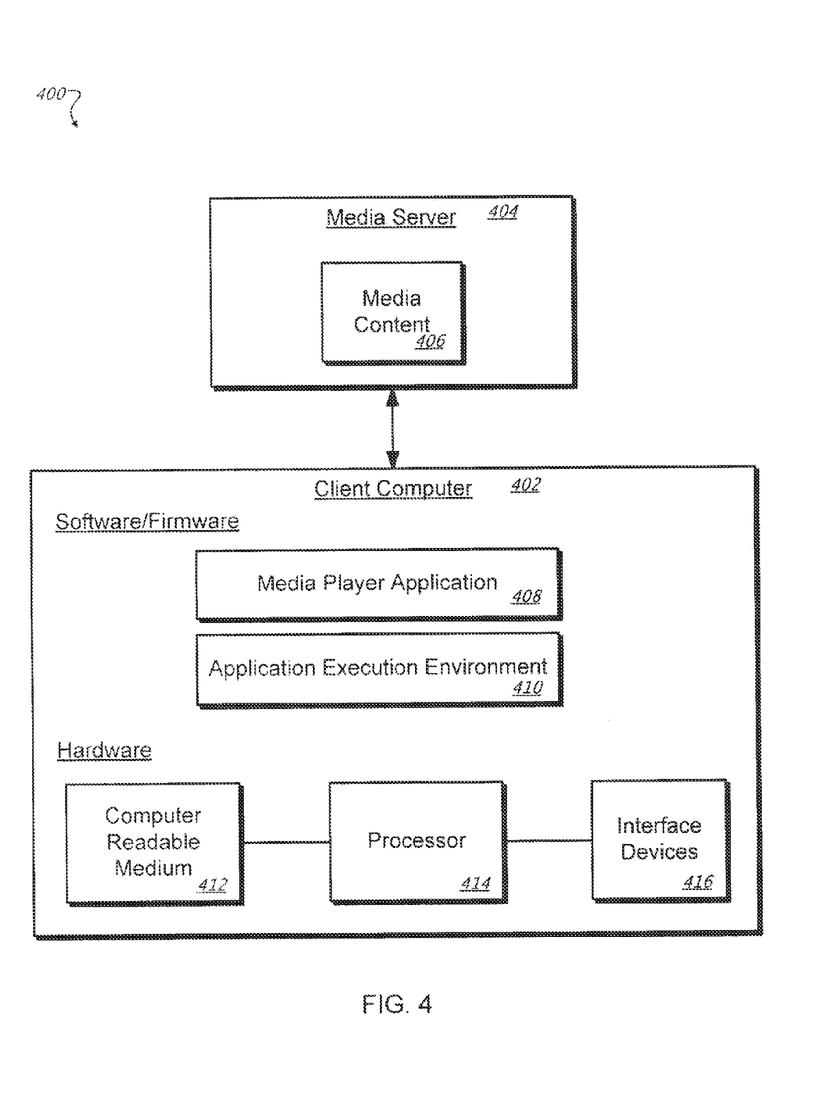
FIG. 4 shows another example client-server environment in which cryptographic information is imparted in network communications for use in playing media content.

FIG. 4 shows another example client-server environment 400 in which cryptographic information is imparted in network communications for use in playing media content. The client-server environment 400 includes a client computer 402 and a media server 404. The media server 404 can provide media content 406 to the client computer 402. For example, media server 404 can include a FLASH® Media Server program. The media content 406 can include web applications, games and movies, and multimedia content for client computers (e.g., home personal computers, mobile phones, personal digital assistants, smart phones, or various embedded devices.)

The client computer 402 can include software, firmware and hardware. The hardware can include a computer readable medium 412, a processor 414, and one or more interface devices 416. The computer readable medium 412 can include one or more hard drives, external drives, magnetic disks, optical disks, tape drives, memories devices, etc. The processor 414 can include one or more central processing units capable of interpreting computer program instructions and processing data, and each processing unit can include one or more processor cores. The interface devices 416 can include one or more display and audio devices (e.g., as computer screens, computer monitors, digital displays, liquid crystal displays (LCDs), light emitting diodes (LEDs), etc.) and audio-capable components (e.g., microphones, speakers, etc.). The interface devices 416 can support a graphical user interface (GUI) by which the user sees, hears and experiences the output of a media player application 408.

The software/firmware can include the media player application 408 and an application execution environment 410. For example, the media player application 408 can be a FLASH® Player program installed on a home computer or other electronic device. The media player application 408 can run in the application execution environment 410, which can be an operating system (OS) for the computer 402, or a cross-OS runtime environment installed on the computer 402, such as the Adobe® Integrated Runtime (AIR™) environment available from Adobe System Incorporated of San Jose, Calif.

The random byte section that embeds the cryptographic information can be included in the network communications between the client computer 402 and the media server 404. For example, the random byte section can be generated by a user's FLASH® Player program and by the FLASH® Media Server program. As noted above, cryptographic information (e.g., including Diffie Hellman key exchange and HMAC information) can be injected into the random byte section at pre-determined or program-determined locations. In some implementations, the locations can be determined by various algorithms, which can use pieces of the random data to index the locations of the cryptographic information. The receiving end of the communication, knowing the new protocol, can locate and remove the cryptographic information from the random byte section. If the cryptographic information can be verified, then the receiving side knows that the new protocol is being used. If the cryptographic information cannot be verified, one or more fallback positions can be checked before determining that the new protocol is not being used (because the expected cryptographic information cannot be found in the random byte section), and thus the communication is of a legacy type. Note that from the perspective of an external eavesdropper, the cryptographic information is seen as nothing more than the previously included random data, which can be used for bandwidth detection.

Figure 5:
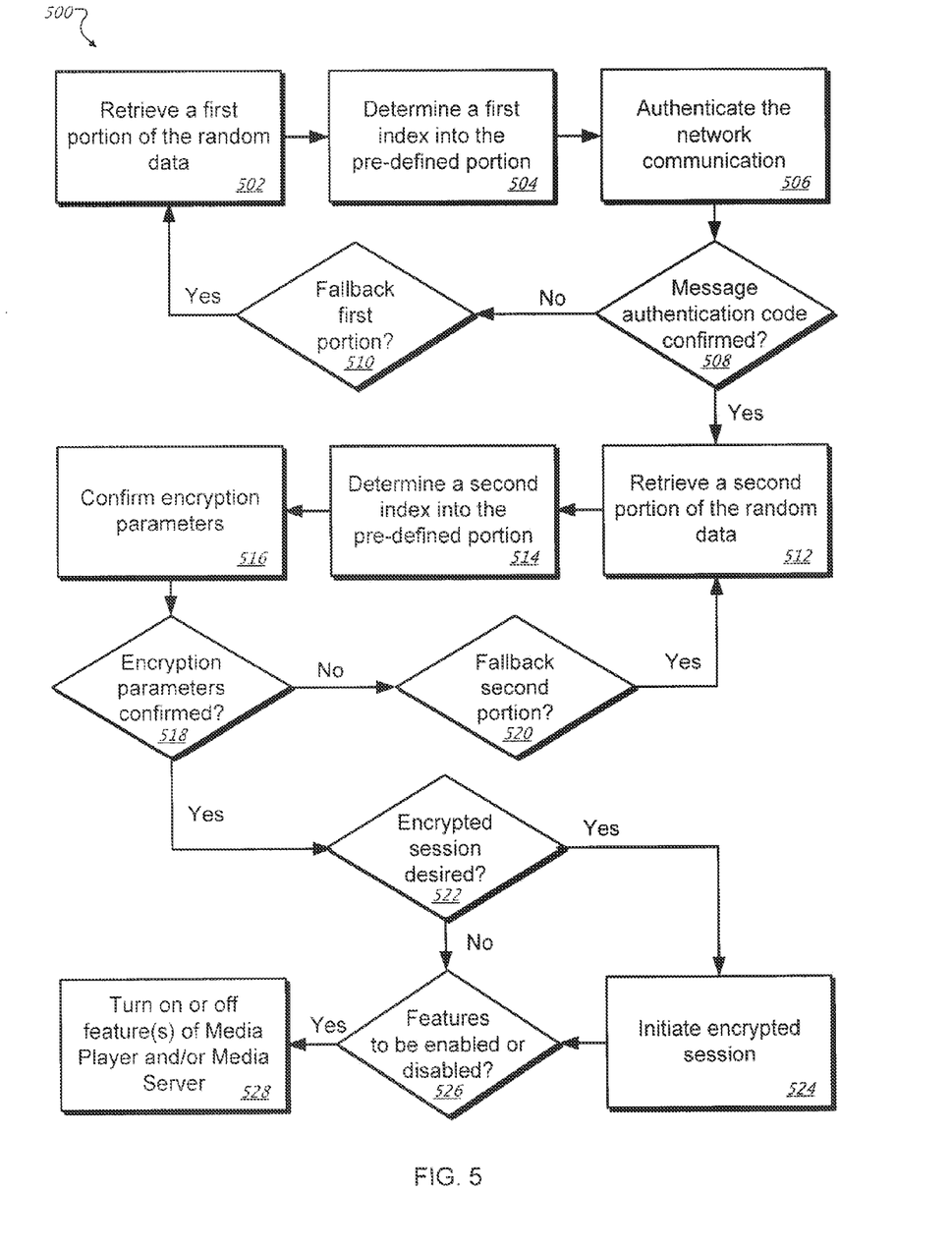
FIG. 5 shows an example process of imparting cryptographic information in network communications for use in establishing encrypted sessions and enabling/disabling features in a media player/server system.

FIG. 5 shows an example process 500 of imparting cryptographic information in network communications for use in establishing encrypted sessions and enabling/disabling features in a media player/server system, such as the client-server environment 400. The process 500 includes operations for authentication, determining encryption parameters, and turning on or off features associated with the network communication. For example, the network communication can involve a user employing a FLASH® Player program to play media available from the FLASH® Media Server program. In some implementations, features can be enabled or disabled based on version information that can be separate from the cryptographic information. For example, feature availability (e.g., audio or visual capabilities) may depend on the version of the FLASH® Player program installed on the user's client computer.

A first portion of the random data can be retrieved 502. For example, in the network communication 300 sent by client computer, the server can look in a pre-determined byte position within the pre-defined portion 310. A first index info the pre-defined portion can be determined 504 based on the retrieved first portion. For example, one or more bytes of the random data can be used as the dividend in a modulo operation, where the divisor is the length of the region of the pre-defined portion 310 set aside for a message authentication code (e.g., an HMAC), minus the length of the message authentication code. The first index can then be set equal to the remainder of this modulo operation plus a pre-defined offset (which may be zero).

Note that various combinations of the random data can be used to generate the dividend. For example, x bytes of the random data can be treated as a single binary number forming the dividend falling in the range of zero to $2^{(8 \times)}-1$, or the same x bytes of the random data can be treated as x binary numbers that are added together to form the dividend falling in the range of zero to $x(2^8-1)$. Various other combinations of the random data are also possible. In addition, the first index can be determined from the first portion of the random data alone, or from the first portion in combination with other information retrieved from the network communication. For example, such other information can come from the header 330 or the payload 340.

In any event, once the index is determined, this index corresponds to the starting position of the cryptographic information used for message authentication (e.g., the starting point of the HMAC) in the block of otherwise random data. The network communication is authenticated 506 using this cryptographic information. For example, the authentication can involve using the first index to access an HMAC in the network communication 300. If the message authentication code is not confirmed 508, then the process 500 can check 510 whether a fallback first portion is available. This occurs when the first index determined 504 fails to locate a message authentication code usable to authenticate 506 the network communication.

In this case, one or more fallback algorithms can be provided for retrieving 502 the first portion and determining 504 the first index. Each fallback algorithm can use a different technique for retrieving 502 the first portion and/or determining 504 the first index. determining 504 the first index. These fallback algorithms can provide additional security for the authentication process, allowing a server system to change the indexing technique when a currently used technique has been discovered, and the client computers can then automatically fall back to the new indexing technique. Once all available fallback algorithms have been tried, the process 500 ends without the network communication having been authenticated.

If the message authentication code is confirmed 508, then a second portion of the random data is retrieved 512. For example, in the network communication 300 sent by client computer, the server can look in another pre-determined byte position within the pre-defined portion 310. A second index into the pre-defined portion can be determined 514 based on the retrieved second portion. For example, one or more bytes of the random data can be used as the dividend in another modulo operation, where the divisor is the length of the region of the pre-defined portion 310 set aside for encryption parameters (e.g., Diffie Hellman information), minus the length of the encryption parameters. The second index can then be set equal to the remainder of this modulo operation plus a pre-defined offset (which may be zero).

As with the message authentication code, various combinations of the random data can be used to generate the dividend. For example, x bytes of the random data can be treated as a single binary number forming the dividend falling in the range of zero to $2^{(8 \times)}-1$, or the same x bytes of the random data can be treated as x binary numbers that are added together to form the dividend falling in the range of zero to $x(2^8-1)$. Various other combinations of the random data are also possible. In addition, the second index can be determined from the second portion of the random data alone, or from the second portion in combination with other information retrieved from the network communication. For example, such other information can come from the header 330 or the payload 340. Moreover, it will be appreciated that the random data section needs to be larger than the total length of the message authentication code and the encryption parameters, e.g., larger than one hundred and sixty bytes when using a thirty two byte HMAC and one hundred and twenty eight bytes of Diffie Hellman information.

In any event, once the index is determined, this index corresponds to the starting position of the encryption parameters used for establishing a cryptographic key (e.g., the starting point of the Diffie Hellman information) in the block of otherwise random data. This cryptographic information in the network communication is confirmed 516. This confirmation can involve using the second index to access and confirm encryption parameters in the network communication 300. If the encryption parameters are not confirmed 518, then the process 500 can check 520 whether a fallback second portion is available. This occurs when the second index determined 514 fails to locate encryption parameters usable to initiate encrypted communications in the client-server environment.

In this case, one or more fallback algorithms can be provided for retrieving 512 the second portion and determining 514 the second index. Each fallback algorithm can use a different technique for retrieving 512 the first portion and/or determining 514 the second index. Note that these algorithms can also be different than those used for the first index. These fallback algorithms can provide additional security for the encrypted session establishment process, allowing a server system to change the indexing technique when a currently used technique has been discovered, and the client computers can then automatically fall back to the new indexing technique. Once all available fallback algorithms have been tried, the process 500 ends without the encryption parameters having been confirmed.

If the encryption parameters are confirmed 518, then a determination 522 can be made if an encrypted session is desired. For example, the encryption parameters can contain information that the session (e.g., session 145) is to be an encrypted session. If so, then the encrypted session is initiated 524. Otherwise, an un-encrypted session can be initiated. Either session (e.g., encrypted or un-encrypted) can be between the client computer 402 (e.g., executing FLASH® Player program) and the media server 404 (e.g., FLASH® Media Server).

If it is determined 526 that one or more features are to be enabled or disabled, then one or more features of the media player, the media server or both, are turned on or off 528. For example, a set of features can be tuned on or off according to the version number of the client media player. This version number can be provided by the client media player (e.g., in non-encrypted and non-disguised form in the handshake 150), and the server can decide to trust the version number provided based on the fact that the client properly incorporated cryptographic information within the random byte section of a network communication (e.g., the client media player is not a legacy player that has been modified to improperly identify itself as a newer version).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form; including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The random data need not be truly random data, but rather can be pseudo random data. Moreover, the pre-defined portion of the network communication need only be reserved for random data, but need not actually include random data in all implementations.

What is claimed is:

1. A method comprising:
   receiving a network communication in a client-server environment at a computer system, the network communication including cryptographic information inserted into a pre-defined portion of the network communication, wherein the pre-defined portion of the network communication is reserved for random data;
   in response to said receiving the network communication, retrieving a first portion of the random data by the computer system;
   determining, by the computer system, a first index into the pre-defined portion of the network communication based on the retrieved first portion of the random data;
   authenticating, by the computer system, the network communication using the determined first index;
   in response to said authenticating the network communication, retrieving a second portion of the random data by the computer system;
   determining, by the computer system, a second index into the pre-defined portion of the network communication based on the retrieved second portion of the random data;
   confirming, by the computer system, the cryptographic information inserted into the pre-defined portion of the network communication using the determined second index;
   determining, by the computer system, that the confirmed cryptographic information specifies that an encrypted session be initiated in the client-server environment; and
   in response to said determining that the encrypted session be initiated, initiating, by the computer system, the encrypted session using the confirmed cryptographic information.

2. The method of claim 1, wherein the determined first index is a starting position of a first portion of the cryptographic information within the pre-defined portion of the network communication, such that the first portion of the cryptographic information is used to authenticate the network communication.

3. The method of claim 2, wherein the first portion of the cryptographic information that is used to authenticate the network communication comprises a hash message authentication code.

4. The method of claim 1, wherein the determined second index is a starting position of a second portion of the cryptographic information within the pre-defined portion of a network communication, such that the second portion of the cryptographic information is used to establish a cryptographic key.

5. The method of claim 4, wherein the cryptographic key established by using the second portion of the cryptographic information comprises a Diffie Hellman key.

6. The method of claim 1, further comprising modifying, by the computer system, interactions in the client-server environment based at least in part on said initiating the encrypted session.

7. The method of claim 6, wherein said modifying the interactions in the client-server environment comprises turning on or off, by the computer system, a feature of a program operating in the client-server environment.

8. A non-transitory computer readable medium encoding instructions that, when executed by data processing apparatus, cause the data processing apparatus to perform operations comprising:
   receiving a network communication in a client-server environment, the network communication including cryptographic information inserted into a pre-defined portion of the network communication, wherein the pre-defined portion of the network communication is reserved for random data;
   in response to said receiving the network communication, retrieving a first portion of the random data;
   determining a first index into the pre-defined portion of the network communication based on the retrieved first portion of the random data;
   authenticating the network communication using the determined first index;
   in response to said authenticating the network communication, retrieving a second portion of the random data;
   determining a second index into the pre-defined portion of the network communication based on the retrieved second portion of the random data;
   confirming the cryptographic information inserted into the pre-defined portion of the network communication using the determined second index;

determining that the confirmed cryptographic information specifies that an encrypted session be initiated in the client-server environment; and in response to said determining that the encrypted session be initiated, initiating the encrypted session using the confirmed cryptographic information.

9. The non-transitory computer readable medium of claim 8, wherein the determined first index is a starting position of a first portion of the cryptographic information within the pre-defined portion of the network communication, such that the first portion of the cryptographic information is used to authenticate the network communication.

10. The non-transitory computer readable medium of claim 9, wherein the first portion of the cryptographic information that is used to authenticate the network communication comprises a hash message authentication code.

11. The non-transitory computer readable medium of claim 8, wherein the determined second index is a starting position of a second portion of the cryptographic information within the pre-defined portion of a network communication, such that the second portion of the cryptographic information is used to establish a cryptographic key.

12. The non-transitory computer readable medium of claim 11, wherein the cryptographic key established by using the second portion of the cryptographic information comprises a Diffie Hellman key.

13. The non-transitory computer readable medium of claim 8, wherein the operations further comprise modifying interactions in the client-server environment based at least in part on said initiating the encrypted session.

14. The non-transitory computer readable medium of claim 13, wherein the operation of modifying the interactions in the client-server environment comprises turning on or off a feature of a program operating in the client-server environment.

15. A system comprising:
one or more hardware processors; and
a storage system storing instructions that, when executed by the one or more hardware processors, cause the system to perform operations comprising:
receiving a network communication in a client-server environment, the network communication including cryptographic information inserted into a pre-defined portion of the network communication, wherein the pre-defined portion of the network communication is reserved for random data;
in response to said receiving the network communication, retrieving a first portion of the random data;
determining a first index into the pre-defined portion of the network communication based on the retrieved first portion of the random data;
authenticating the network communication using the determined first index;
in response to said authenticating the network communication, retrieving a second portion of the random data;
determining a second index into the pre-defined portion of the network communication based on the retrieved second portion of the random data;
confirming the cryptographic information inserted into the pre-defined portion of the network communication using the determined second index;
determining that the confirmed cryptographic information specifies that an encrypted session be initiated in the client-server environment; and
in response to said determining that the encrypted session be initiated, initiating the encrypted session using the confirmed cryptographic information.

16. The system of claim 15, wherein the determined first index is a starting position of a first portion of the cryptographic information within the pre-defined portion of the network communication, such that the first portion of the cryptographic information is used to authenticate the network communication.

17. The system of claim 16, wherein the first portion of the cryptographic information that is used to authenticate the network communication comprises a hash message authentication code.

18. The system of claim 15, wherein the determined second index is a starting position of a second portion of the cryptographic information within the pre-defined portion of a network communication, such that the second portion of the cryptographic information is used to establish a cryptographic key.

19. The system of claim 18, wherein the cryptographic key established by using the second portion of the cryptographic information comprises a Diffie Hellman key.

20. The system of claim 15, wherein the operations further comprise modifying interactions in the client-server environment based at least in part on said initiating the encrypted session.

21. The system of claim 20, wherein the operation of modifying the interactions in the client-server environment comprises turning on or off a feature of a program operating in the client-server environment.

* * * * *

UNITED STATES PATENT AND TRADEMARK OFFICE
CERTIFICATE OF CORRECTION

PATENT NO. : 8,284,932 B2  
APPLICATION NO. : 13/304304  
DATED : October 9, 2012  
INVENTOR(S) : Asa Whillock et al.

Page 1 of 1

It is certified that error appears in the above-identified patent and that said Letters Patent is hereby corrected as shown below:

In Column 1 Line 10 After "to," delete "co-pending,"

Signed and Sealed this  
First Day of January, 2013

David J. Kappos  
*Director of the United States Patent and Trademark Office*